July 30, 1968 A. G. GRACE 3,394,854
TAPE TRANSPORT CONTROL CIRCUITS
Filed March 24, 1967
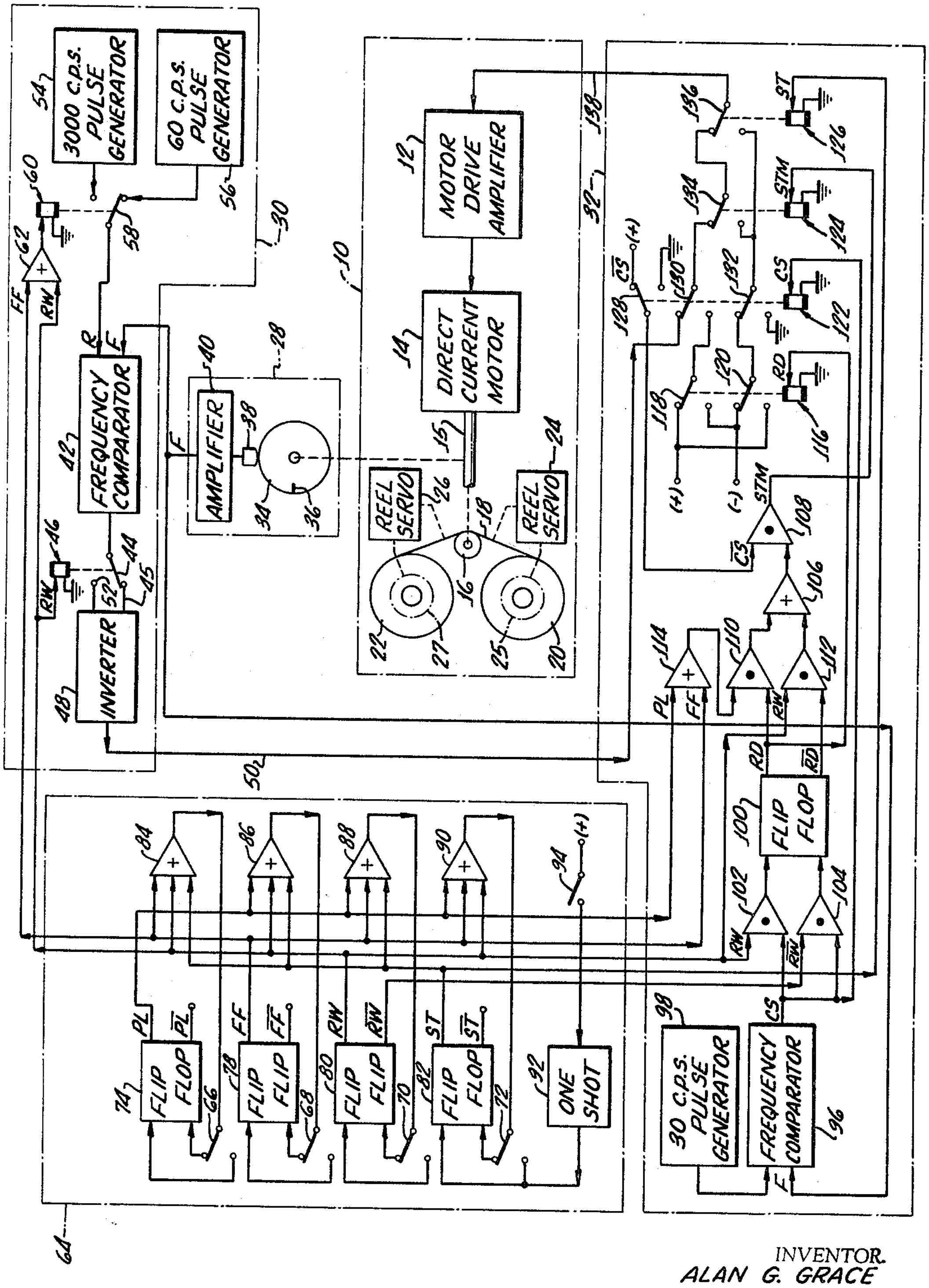
INVENTOR.
ALAN G. GRACE
BY
FOWLER, KNOBBE & MARTENS
ATTORNEYS.

United States Patent Office 3,394,854
Patented July 30, 1968

3,394,854
TAPE TRANSPORT CONTROL CIRCUITS
Alan G. Grace, San Carlos, Calif., assignor, by mesne assignments, to Allan R. Fowler, Orange, Calif., trustee
Filed Mar. 24, 1967, Ser. No. 625,757
10 Claims. (Cl. 226—49)

ABSTRACT OF THE DISCLOSURE

A tape transport system is controlled by digital command signals for play, stop, fast forward, and rewind by varying the capstan drive servo loop to produce the different capstan speeds and directions of rotation inherent in the commands and by a transition control circuit which preempts the capstan drive servo loop and controls the driving means during transitional intervals between commands.

This invention relates to tape transport control circuits, and has particular reference to a control system for establishing capstan drive conditions for play, stop, fast forward and rewind.

There is a large variety of tape transport control systems which involve the use of various braking means for the tape reels, the engagement and disengagement of pinch rollers to couple the tape to the drive capstan, the application of command control signals to the reel motors, and the utilization of various mechanical and electromechanical means for sensing the direction of tape movement. These control systems become very complex when a high fidelity of performance is necessary, particularly in situations where the transitions between different tape transport commands for play, stop, fast forward, and rewind are necessarily short predictable intervals such that the operation of several tape recorders may be programmed by a computer to provide an integrated continuous record, as might be occasioned for example by the editing of selective sequences from video tape recorders and the insertion of commercial and other sequences at selected times. In addition, the servo mechanisms, more commonly known as the servo loops, which control the conventional tape transport systems are burdened in complexity or design compromise by the requirements for machine control during the transitional intervals between the full execution of successive tape transport commands.

The present invention solves these problems by providing a control system which in its preferred form is susceptible to direct computer programming, the system providing relatively smooth transition between tape transport commands with the transition intervals being brief and predictable to a high degree, all without burdening to any significant degree the tape transport servo loop for the magnetic tape recorder.

In accordance with the present invention, a magnetic tape recorder having a tape drive capstan, means for driving the capstan and a servo loop for controlling the drive means is provided with a control system for establishing capstan drive conditions for play, stop, fast forward and rewind. The control system includes means for selectively producing command signals respectively corresponding to the play, stop, fast forward and rewind conditions. In addition, the control system includes means responsive to the command signals for varying the servo loop to produce the different capstan speeds and directions of rotation inherent in the commands, and a transition control circuit responsive to the command signals and to the speed and direction of rotation of the capstan for preempting the servo loop and controlling the driving means during transitional intervals between certain commands.

This control circuit is especially applicable, and the present invention contemplates the combination of it with, a tape transport which includes a supply reel and a takeup reel both maintained substantially at constant tape tension, under all the command conditions, with the capstan remaining in constant driving engagement with the tape.

In the preferred embodiment of the invention, the servo loop includes a frequency comparator of desired sophistication, meaning it can be sensitive to frequency difference and when in frequency lock to phase difference as well. The frequency comparator produces a servo control signal in accordance with the difference between a reference signal and a feedback signal, the feedback signal being generated responsive to the capstan driving means. The means for varying the servo loop comprises means responsive to the fast forward and rewind command signals for varying the reference signal frequency, and means responsive to the rewind command signal for reversing the directional effect of the servo control signal on the drive means.

The means for selectively producing command signals in the preferred embodiment of the invention provides a plurality of digital switching means, one for each of the commands, and a corresponding plurality of digital registers for registering the actuation of the respectively associated switching means, and means coupled to the registers for resetting all other registers when one of the registers is actuated by its switching means.

Further, in the preferred embodiment of the invention the transition control circuit includes means for sensing the speed and direction of rotation of the capstan, and means responsive to the sensing means and to a change in the command signals requiring a change in the direction of rotation of the capstan for preempting the servo loop and controlling the drive means until a threshold capstan speed in the new direction is achieved. Similarly a means responsive to a stop command is included for preempting the servo loop and controlling the drive means to stop the capstan, and a means responsive to a command signal changing a previous stop command is included for preempting the servo loop for controlling the driving means until a threshold capstan speed is achieved in the direction required by the command.

In the preferred embodiment fo the invention, the major control for the various means which preempt the servo loop and control the driving means during transition is effected through a sensing means which provides a digital signal at one level responsive to the capstan achieving a threshold speed and a digital signal at a second level responsive to the capstan speed being less than the threshold speed, with the threshold speed being substantially less than the slowest of the command speeds, namely the play speed.

It will be appreciated that no effort is devoted to distinguishing between command signals for play or record, since in a magnetic tape recorder the play and record commands are the same so far as the tape transport system is concerned, the difference in some systems being only that the reference and feedback signals used to drive the capstan servo may be derived from different sources, which is a well understood conventional difference. Hence, as used herein the play command refers both to play and record.

The present invention and its advantages will be more clearly understood with reference to the accompanying drawing, which is a simplified schematic circuit diagram illustrating the preferred embodiment of the invention.

Referring now to the drawing, a tape transport system 10 includes a motor drive amplifier 12 which controls a direct current motor 14 which in turn drives from its shaft 15 a tape drive capstan 16 that remains constantly in driving engagement with the tape 18. The tape is supplied by a tape supply reel 20 past the capstan to a tape takeup reel 22. The tape is not driven by the reels, rather it is driven only by the capstan, and the supply and takeup reels merely maintain a constant tension in the tape on each side of the capstan by means of conventional reel servos 24, 26 respectively sensitive to tape tension for controlling the torque exerted by reel servo motors 25, 27 for the respective reels.

A capstan drive servo loop runs from the motor shaft 15 around to the input of the motor drive amplifier 12. This servo loop includes a feedback pulse generator 28, a capstan servo circuit 30, and several switches (to be later described) in a transition control circuit 32.

The feedback pulse generator generates feedback pulses, hereafter referred to as F pulses, and by way of example may include a disc 34 having one or more magnetic marks 36 permanently etched thereon, the disc being driven by the motor shaft 15 in proximity to a magnetic pickup head 38 coupled to an amplifier 40. This is usually the type of feedback pulse generator utilized in the record operation of a magnetic tape recorder. In the play or playback operation, normally the feedback pulse generator will take the well known form of a magnetic pickup head sensing a recorded signal frequency on the tape (not illustrated). In either event, the frequency of the F pulses is determined in whole or in major part by the speed of the driving means, in this case the direct current motor 14.

The capstan drive servo circuit 30 includes a frequency comparator 42 which compares the frequency of the F pulses with the frequency of a reference signal, or R pulses, such that the frequency comparator provides a positive output signal when the F pulses are at a lesser frequency than the R pulses and a less positive or negative output signal when the F pulses are at a greater frequency than the R pulses. The outputs of the frequency comparator is supplied through a normally closed contact of the switch 44 of a relay 46, which is in turn connected to one input 45 of an inverter 48 and emerges on an output lead 50 from the inverter as a servo control signal of the same polarity as the output signal from the frequency comparator 42. As is later described, when this relay 46 is energized by the rewind or RW command signal level, the switch moves to its normally open contact, which is connected to a second input terminal 52 of the inverter, such that the emerging servo control signal on the output lead 50 from the inverter is of opposite polarity to the output signal from the frequency comparator 42. Thus when the relay 46 is energized the servo loop is varied to produce a servo control signal of opposite polarity, such that the direct current motor is driven under control of the servo in the rewind or backward direction.

The reference pulses are produced by two reference pulse generators, one reference pulse generator 54 providing a relatively high frequency of 3,000 cycles per second and the other reference pulse generator 56 providing a relatively low frequency of 60 cycles per second. Selection of either of these reference pulse frequencies is provided by the switch 58 of a relay 60, the switch being connected to the input of the frequency comparator. The normally closed position of the switch 58 couples the 60 cycles per second reference pulse generator to the input of the frequency comparator. A fast forward FF or rewind RW command signal level is required through an "or" gate 62 to energize the relay 60 causing the switch 58 to couple the frequency comparator input to the 3,000 per second reference pulse generator whereby a faster controlled speed is obtained for rewind or fast forward purposes. Thus, the servo loop is varied by utilizing the FF and RW commands to vary the reference signal frequency. Further, it will be appreciated that in some magnetic tape recorders the reference pulse frequency during the play mode may be derived from sources other than fixed pulse generators, such as in a video tape recorder from a circuit sensing the rotary position of a magnetic recording head drum (not shown).

A digital command circuit 64 includes a plurality of spring biased switches 66, 68, 70, 72 respectively associated with the command signals for play PL, fast forward FF, rewind RW, and stop ST commands. As illustrated each switch is a manual switch in the form of a leaf spring biased to its normal setting. The switches are actuated by momentarily depressing any of them, to give the associated command. A corresponding plurality of digital registers in the form of flip flops 74, 78, 80, 82 respectively are associated with the switches. The switches are normally biased to the reset terminals of the flip flops and when depressed close to the set terminals of the flip flops. When set, the flip flops respectively produce the command signal levels PL, FF, RW and ST respectively at their set output terminals. Correspondingly, when reset, the command signals levels on the set output terminals of the flip flops go to "0," and the signal levels on the reset terminals $\overline{PL}$, $\overline{FF}$, $\overline{RW}$ and $\overline{ST}$ respectively go to "1."

"0" and "1" are digital signal levels used in the conventional well understood form to refer to the inactive and active levels of the signals respectively.

Companion to the flip flops is a corresponding plurality of "or" gates 84, 86, 88, 90 respectively, the output from each "or" gate running to the associated command switches 68, 69, 70, 72 respectively each of which is normally closed with the reset input terminal of its associated flip flop. By inspection it will be seen that the set output terminal of each of the flip flops runs to the input of each of the "or" gates associated with the other flip flops such that by depressing a selected command switch the flip flop associated with it is set, and the flip flops associated with the other commands all are reset. To insure a proper starting condition, a one-shot pulse generator 92 is coupled to the set terminal of the stop flip flop 82, and generates a single pulse to set this flip flop on the closing of a switch 92 when the power supply (not shown) for the system is initially turned "on."

The transition control circuit 32 includes a frequency comparator 96 for sensing the speed of rotation of the capstan. More particularly, the frequency comparator compares the frequency of pulses from a 30 cycles per second pulse generator 98 with the F pulses from the feedback pulse generator 28 to provide an output signal level called the control speed or CS level. CS is a digital "1" when the F pulses are less than 30 cycles per second and a digital "0" when the F pulses are greater than 30 cycles per second. The generation of F pulses at 30 cycles per second is chosen as a threshold speed for the capstan, independent of direction of rotation. As can be seen, the threshold speed is substantially less than the play speed where the direct current motor 14 is controlled by the capstan servo circuit 30 at an R pulse frequency of 60 cycles per second.

The transition control circuit 32 also includes a register in the form of a flip flop 100 which provides a reverse direction or RD signal level on its set output terminal and $\overline{RD}$ on its reset output terminal. RD is a digital "1" and $\overline{RD}$ is "0" when the flip flop is set, and the converse is true when the flip flop is reset. The RD flip flop 100 registers the direction of rotation of the capstan at speeds above the threshold speed, although it may or may not indicate the instantaneous direction of the rotation of the capstan within the threshold speed. This is accomplished by applying the CS and RW signal levels through an "and" gate 102 to the set input terminal of the RD flip flop 100, and the $\overline{RW}$ and CS signal levels through another "and" gate 104 to the reset terminal of the RD flip flop.

Included in the transition control circuit 32 is a means for generating a logical stop momentarily or STM signal level. The function of the STM signal level is to respond to capstan speeds above the threshold in conjunction with a command signal requiring a reversal of the direction of the capstan to supply a control signal to the driving means commanding it to run in the opposite direction until its speed is reduced to the threshold speed. This is accomplished by supplying a $\overline{CS}$ signal in conjunction with the output of an "or" gate 106 to the input of an "and" gate 108, the output from which is the STM signal level. First and second "and" gates 110, 112 are coupled to the input of the "or" gate 106. The first "and" gate receives at its input the signal level RD and the output of an "or" gate 114 to which is applied the PL and FF command signal levels. The second "and" gate 112 receives at its input the RW command signal level and the $\overline{RD}$ signal level.

The transition control circuit also includes a logical switching network comprised of four relays and their associated switches, including an RD relay 116 actuated by the RD signal level to reverse the polarity of fixed signal levels applied through its first and second switches 118, 120, a control speed or CS relay 122 actuated by the CS signal level and having first, second and third switches 128, 130, 132, a STM relay 124 actuated by the STM signal level and having a single switch 134, and an ST relay 126 actuated by the ST signal level and having a single switch 136. The pole of the ST relay switch 136 is connected by a lead 138 to the input of the motor drive amplifier 12 to complete the capstan drive servo loop.

The first switch 128 of the CS relay provides the $\overline{CS}$ signal level when the relay is deenergized, that is, when CS is "0" due to the capstan speed being greater than the threshold speed. The second CS relay switch 130 serves to couple the output control signal lead 50 from the capstan servo circuit 30 through the STM and ST switches 134, 136 to the motor drive amplifier when CS is "0" due to the capstan speed being greater than the threshold speed, and to couple the fixed signal level on the first switch 118 of the RD relay to the motor drive amplifier through the STW and ST switches when CS is "1" due to the capstan speed being less than the threshold speed. The third switch 132 of the CS relay, in its normally closed condition as shown, couples the fixed signal level on the second RD switch 120 to the normally open contacts of the STM and ST switches 134, 136, hence to the motor drive amplifier when either of the STM or ST relays is actuated. When CS is "1" this same third switch 132 of the CS relay closes to ground potential.

To illustrate the operation of the control system, it will be assumed that power is turned "on," and the following command signals are given in order: play, fast forward, rewind, and stop.

When power is turned on the one-shot pulse generator 92 in the digital command circuit 64 will set the stop flip flop 82 and reset the other flip flops in the command circuit such that ST and $\overline{RW}$ go to "1" and RW, FF and PL go to "0." With the capstan at rest under these conditions, CS is "1." Thus the CS and ST relays are energized so that ground potential is supplied from the third switch 132 of the CS relay to the motor drive amplifier. Also at this time it is noted that the RD flip flop 100 is reset so that RD is "0" and $\overline{RD}$ is "1," and that STM is "0."

When the play switch 68 is momentarily depressed ST goes to "0" and PL goes to "1." With ST at "0," the ST relay is deenergized and a fixed positive signal level is coupled from the first switch 118 of the RD relay, through the second switch 130 of the CS relay, and through the switches 134, 136 of the STM and ST relays to the motor drive amplifier, thus driving the direct current motor rapidly in the forward direction until threshold speed is reached, at which moment CS goes to "0" such that the second switch 130 of the CS relay closes to the servo control output lead 50 thereby supplying the servo control signal to the motor drive amplifier. Since RW and FF are both "0," the relays 46, 60 in the capstan servo circuit 30 respectively controlling the inverter input and the reference pulse frequency are both deenergized. Under these conditions the servo control signal is not inverted and the reference pulse frequency is 60 cycles per second, such that the servo control signal will continue to bring up the capstan speed until the F pulses are produced at 60 cycles per second.

On depressing the fast forward switch 69 when in the play mode, FF goes to "1" and PL goes to "0". This energizes the relay 60 controlling the reference pulse frequency which actuates its switch 58 to the output terminal of the 3,000 cycles per second pulse generator 54 whereby the servo control signal on the output lead 50 continues to drive the capstan at an increasing speed until the F pulses reach 3,000 cycles per second.

On depressing the rewind switch 70 while in the fast forward mode, FF and $\overline{RW}$ go to "0" and RW goes to "1." Since the capstan is at above threshold speed $\overline{CS}$ is "1" and with RW at "1" and the RD flip flop 100 reset such that $\overline{RD}$ is "1," STM goes to "1" actuating the STM relay. Actuating the STM relay closes the STM relay switch 134 thereby preempting the servo loop and applying a fixed negative signal level to the motor drive amplifier from the second RD relay switch 120. This negative signal level rapidly decelerates the capstan to below the threshold speed whereupon CS goes to "1" setting the RD flip flop 100, causing RD to go to "1" and actuate the RD relay 116 to reverse the polarity of the signal levels on its switches. With $\overline{CS}$ at "0," STM goes to "0" such that a fixed negative signal level is now applied from the first switch of the RD relay through the second switch 130 of the CS relay and the switches 134, 136 of the STM and ST relays to the motor drive amplifier. This negative signal level continues, rapidly reducing the forward speed of the capstan to "0" and then accelerating it to the threshold speed in the reverse direction, at which point CS goes to "0" thereby coupling the capstan servo control signal through the second switch 130 of the CS relay and the switches 134, 136 of the STM and ST relays to the motor drive amplifier, such that the motor drive amplifier is now under control of the capstan servo loop. In the capstan servo loop the relay 46 controlling the inverter is actuated by the RW signal level so that the output of the frequency comparator 42 is inverted. The capstan servo control signal brings the capstan up to a speed in the reverse direction which produces F pulses at a 3,000 cycle per second rate.

On depressing the stop switch 72 when in the rewind mode, the stop relay 126 will immediately be actuated thereby preempting the servo loop and closing a fixed positive signal level from the second RD switch 120 to the motor drive amplifier, to produce a rapid deceleration of the capstan which is turning at a high speed in the reverse direction. When the capstan speed is decelerated to below threshold speed, CS goes to "1" actuating the CS relay thus closing a ground level signal through the third switch 132 of the CS relay to the motor drive amplifier, permitting the capstan to coast to a stop.

I claim:

1. In a magnetic tape recorder having a tape drive capstan, means for driving the capstan and a servo loop for controlling the driving means; a control system for establishing capstan drive conditions for play, stop, fast forward and rewind, said control system comprising: means for selectively producing command signals respectively corresponding to the play, stop, fast forward and rewind conditions; means responsive to said command signals for varying the servo loop to produce the different capstan speeds and directions of rotation inherent in the commands; and, a transition control circuit responsive to the command signals and to the speed and direction of rotation of the capstan for preempting the servo loop and controlling the driving means during transitional intervals between certain commands.

2. The apparatus of claim 1 wherein the magnetic tape recorder includes a supply reel and a take-up reel both maintained substantially at constant tape tension under all capstan driving conditions, with the capstan remaining in constant driving engagement with the tape.

3. The apparatus of claim 1 wherein the servo loop includes means for generating a reference signal, means responsive to the driving means for generating a feedback signal, a frequency comparator for generating a servo control signal in accordance with frequency difference between the reference and feedback signals; and wherein the means for varying the servo loop comprises means responsive to the fast forward and rewind command signals for varying the reference signal frequency, and means responsive to the rewind command signal for reversing the directional effect of the servo control signal on the driving means.

4. The apparatus of claim 1 wherein the means for selectively producing command signals comprises a plurality of switching means each associated with a different command, a corresponding plurality of digital registers for registering the actuation of the respectively associated switching means, and means coupled to the registers for resetting all other registers when one of the registers is actuated by its switching means.

5. The apparatus of claim 1 wherein the transition control circuit comprises means for sensing the speed and direction of rotation of the capstan, and means responsive to the sensing means and to a change in the command signals requiring a change in the direction of rotation of the capstan for preempting the servo loop and controlling the driving means until a threshold capstan speed in the new direction is achieved.

6. The apparatus of claim 5 wherein the transition control circuit also includes means responsive to the sensing means and to a stop command signal for preempting the servo loop and controlling the driving means to stop the capstan.

7. The apparatus of claim 6 wherein the transition control circuit also includes means responsive to the sensing means and a command signal changing a previous stop command for preempting the servo loop and controlling the driving means until a predetermined capstan speed is achieved in the direction required by the command.

8. The apparatus of claim 5 wherein the sensing means includes means for producing a digital signal at one level responsive to the capstan exceeding a threshold speed in either direction and for producing a digital signal at a second level responsive to the capstan speed being less than the threshold speed, the threshold speed being substantially less than play speed.

9. The apparatus of claim 8 wherein the sensing means also includes a register responsive to the command signals for providing a digital signal at two levels indicative of the direction of rotation of the capstan at speeds above the threshold speed.

10. The apparatus of claim 6 wherein the means for controlling the driving means to reverse the direction of the capstan and the means for controlling the driving means to stop the capstan include a means for supplying a control signal to the driving means commanding it to run in the opposite direction until its speed is reduced to a threshold speed.

References Cited

UNITED STATES PATENTS 2,963,555 12/1960 Brubaker ---------- 226—42 X

ALLEN N. KNOWLES, *Primary Examiner.*